Oct. 26, 1954 G. W. HARDY 2,692,571
REMOTE-CONTROL HYDRAULIC STEERING APPARATUS FOR SHIPS
Filed Aug. 2, 1948 6 Sheets-Sheet 1

FIG. 1

INVENTOR.
GORDON W. HARDY
BY
AGENT

INVENTOR.
GORDON W. HARDY
BY
Wm. H. Dean
AGENT

*INVENTOR.*
*GORDON W. HARDY*

BY

*AGENT*

Patented Oct. 26, 1954

2,692,571

UNITED STATES PATENT OFFICE 2,692,571

REMOTE-CONTROL HYDRAULIC STEERING APPARATUS FOR SHIPS

Gordon W. Hardy, Chula Vista, Calif.

Application August 2, 1948, Serial No. 41,981

7 Claims. (Cl. 114—150)

My invention relates to a hydraulic steering apparatus, more particularly for use in connection with various vehicles, such as boats or the like, and the objects of my invention are:

First, to provide a steering apparatus of this class in which the control of a rudder may be remotely accomplished by means of hydraulic tubular conductors extending intermediate an actuating cylinder and an operating cylinder, wherein a cable extends through the tubular conductor interconnecting the pistons in the actuating cylinder and the operating cylinder, which insures mechanical operation of the steering apparatus in the event leakage occurs in the hydraulic equipment of the apparatus;

Second, to provide a hydraulic steering apparatus of this class in which certain resilient means engaging the hydraulic fluid within the apparatus permits slight deflection of the steering mechanism, such as the rudder, or wheels of a vehicle, without damage to the hydraulic equipment of the apparatus;

Third, to provide a hydraulic steering mechanism of this class having novel directional indicating means associated therewith, which registers the angular deflection of the steering mechanism of a vehicle, so that the operator of a boat or the like may determine with a glance the extent of deflection of the rudder and the particular direction thereof;

Fourth, to provide a hydraulic steering apparatus of this class having novel means for maintaining tension of cables passing through the hydraulic conductor tubes from one piston to another piston;

Fifth, to provide an apparatus of this class having novel means for maintaining yieldable relationship of pistons hydraulically associated with each other, whereby shock imposed upon the mechanism of the apparatus is readily absorbed without damage;

Sixth, to provide a hydraulic steering apparatus of this class in which the actuated shaft controlling a vehicle's steering mechanism may be considerably deflected without damage to the mechanism;

Seventh, to provide a hydraulic steering apparatus of this class having novel manual control means in connection therewith, operative in case the hydraulic mechanism becomes damaged or is rendered inoperative;

Eighth, to provide a hydraulic steering mechanism of this class having novel means for bleeding various hydraulic conductor portions and casings thereof;

Ninth, to provide a novel angular transition fitting which routes cables around corners in hydraulic conductor tubes of my hydraulic steering apparatus;

Tenth, to provide a steering apparatus of this class which is very smooth, very responsive to hand control, and very easy to operate;

Eleventh, to provide a hydraulic steering mechanism of this class having particularly desirable characteristics for installation in boats or the like for controlling rudders therein; and Twelfth, to provide a hydraulic steering apparatus of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Similar characters of reference refer to similar parts and portions throughout the several views of the dawings.

The casings 1 and 2, pistons 3, 4, 5 and 6, crosshead 7, screw 8, thrust bearings 9 and 10, retainer nut 11, cables 12, cylinder caps 13, cap locks 14, lever 15, shaft 16, cylinder caps 17, cap locks 18, direction-indicating needle 19, needle actuating pistons 20 and 21, casing 22, piston connecting pin 23, cable transition casings 24 to 35, inclusive, vacuum relief casings 36 to 39, inclusive, cable connection casings 40 to 43, inclusive, surge chambers 44 to 47, inclusive, steering wheel 48, steering shaft 49, cable take-up casings 50 to 53, inclusive, cable and hydraulic conductors 54 to 77, inclusive, and hydraulic tubes 78 to 82, inclusive, constitute the principal parts and portions of my hydraulic steering apparatus.

Figure 1:
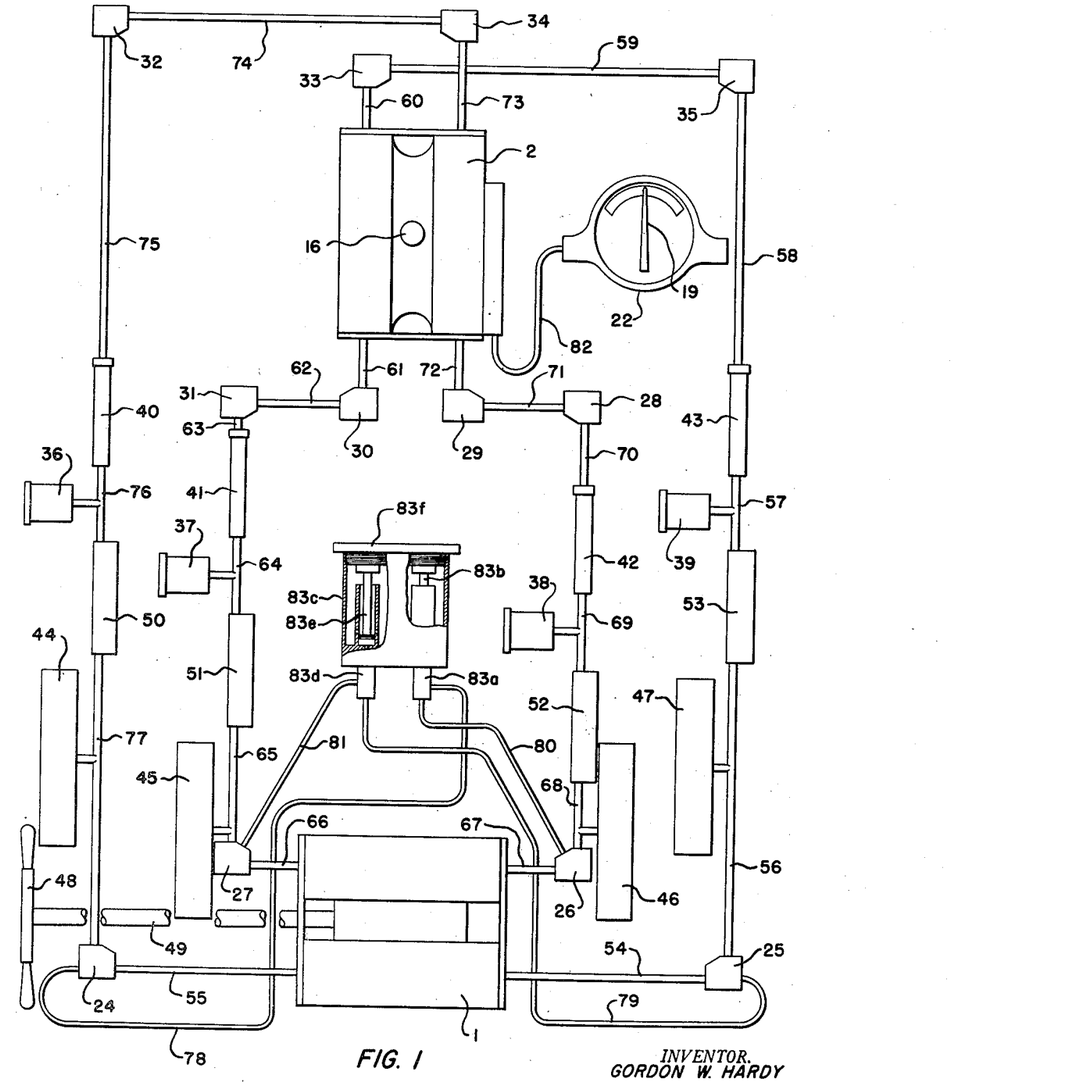
Fig. 1 is a diagrammatic view of the mechanical features of my hydraulic steering apparatus.
Figure 2:
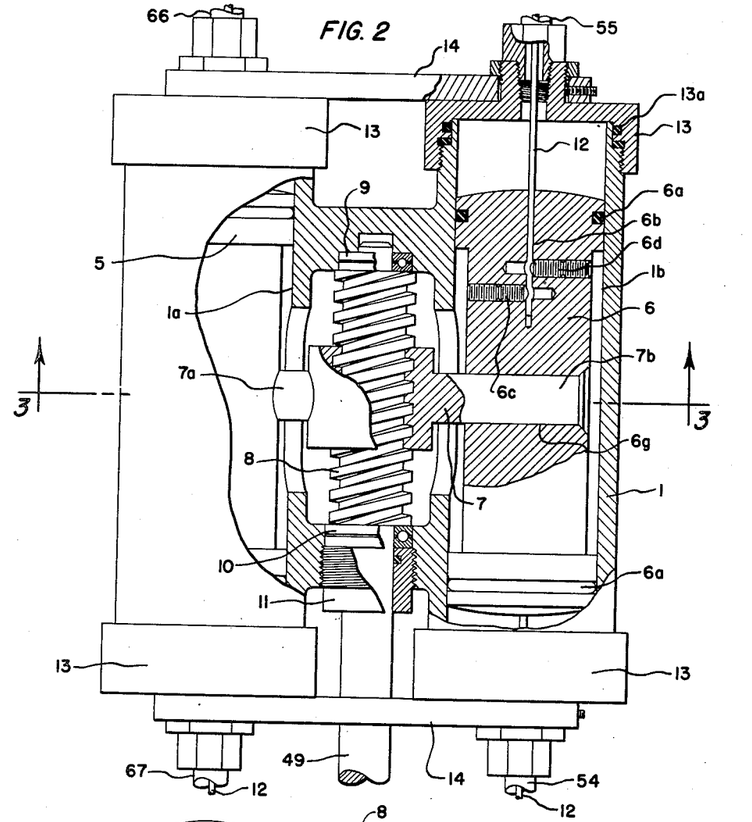
Fig. 2 is an enlarged side elevational view of the master cylinder and casing of my hydraulic steering apparatus, showing portions broken away and in section to amplify the illustration.
Figure 3:
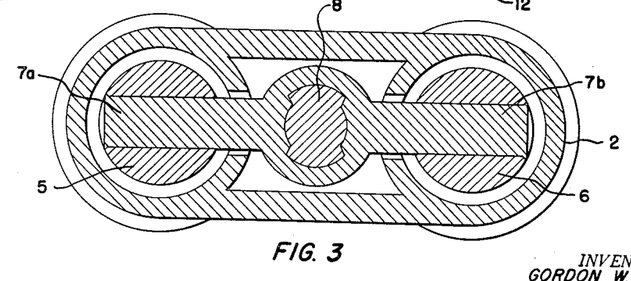
Fig. 3 is a sectional view taken from the line 3—3 of Fig. 2.
Figure 4:
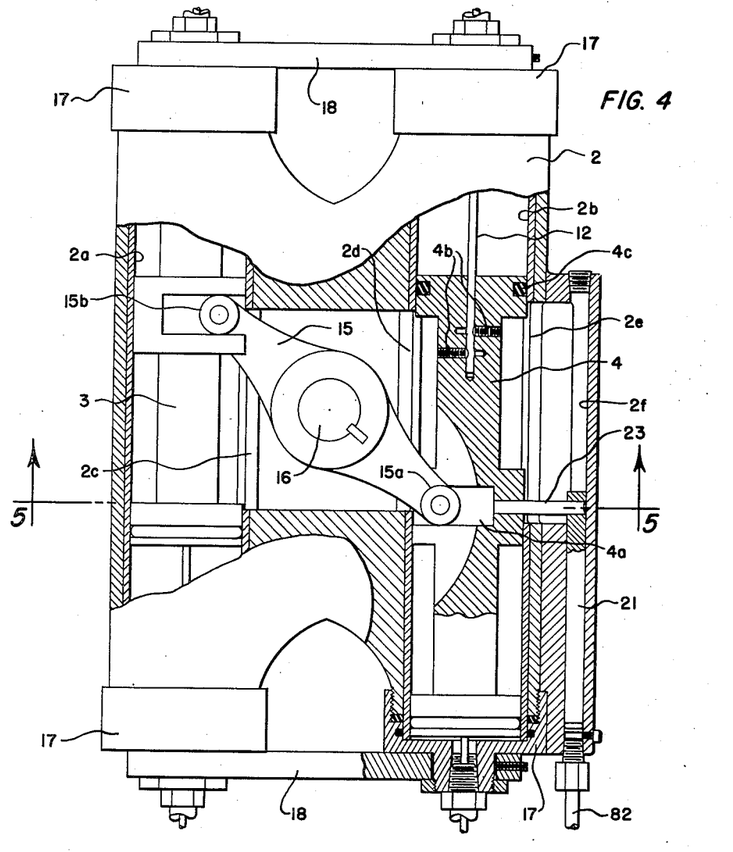
Fig. 4 is an enlarged fragmentary side elevational view of the actuated cylinder and casing of my hydraulic steering apparatus, showing portions broken away and in section to amplify the illustration.
Figure 5:
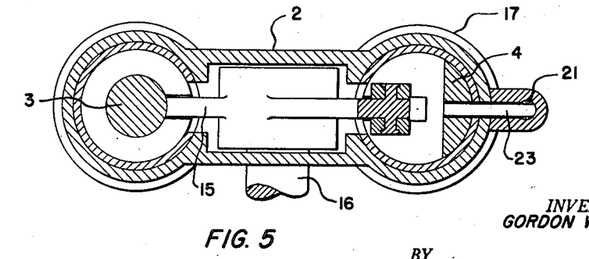
Fig. 5 is a sectional view taken from the line 5—5 of Fig. 4.

The casing 1, as shown in Fig. 2 of the drawings, is the master control casing for my hydraulic steering actuator, forming the master hydraulic cylinder assembly, from which fluid is projected through the casing 2 forming the hydraulic cylinder for the actuated assembly. This casing 1 is provided with two parallel bore portions 1a and 1b, in which the pistons 5 and 6 are reciprocally mounted. These pistons 5 and 6 are similar in construction. The piston 6, as shown reciprocally mounted in the bore portion 1b, is provided with a conventional full ring sealing member 6a at each opposite end thereof. This piston 6 is also provided with a central bore portion 6b in which one end of one of the cables 12 is fixed by means of the set screws 6c and 6d. These cables 12 pass outwardly through the hydraulic conductor tubes 54 and 55, which tubes are arranged to conduct the hydraulic fluid, in addition to forming guides for the cables 12. Enclosing opposite ends of each of the bore portions 1a and 1b of the casing 1 are the sealing caps 13, having O-rings 13a therein, arranged to prevent the leakage of fluid outwardly of said bore portions 1a and 1b at opposite ends. Revolubly mounted in the casing 2 intermediate the bore portions 1a and 1b is the screw 8, connected to the steering shaft 49, carrying the steering wheel 48, all as shown best in Fig. 1 and Fig. 2 of the drawings. It will be noted that the thrust bearings 9 and 10 are adapted to support the screw 8 at its opposite ends in the casing 1, and the retainer 11 is screw-threaded into abutted relationship with the bearing 10 for preloading these bearings 9 and 10, maintaining tolerance operation of the crosshead 7, which is internally screw-threaded and engageable with the external screw-threads of the screw 8. This crosshead 7 is provided with opposed arm portions 7a and 7b, engaging the pistons 5 and 6, respectively, in a similar manner. The piston 6, as shown in Fig. 2 of the drawings, is provided with a transverse bore portion, 6g, in which the arm 7b of the crosshead 7 is engaged. The cable and hydraulic conductors, 54 to 77, inclusive, conduct hydraulic fluid in addition to their service as containers and guides for the cables 12, which interconnect the pistons 5 and 4, respectively, and the pistons 6 and 3, respectively, in the casings 1 and 2, respectively. It will be here noted that the cables 12 extend from opposite ends of each of the pistons 3 to 6, inclusive, and are contained in the cable and hydraulic conductors 54 to 77, inclusive. These cables 12 pass through the cable transition casings 24 to 35, the cable connection casings 40 to 43, and the cable take-up casings 50 to 53, inclusive, intermediate the casings 1 and 2, all as shown best in Fig. 1 of the drawings. The casing 2 is provided with separate parallel bore portions 2a and 2b, in which the pistons 3 and 4, respectively, are reciprocally mounted. These pistons 3 and 4 are similar in construction. The piston 4 is provided with a transverse track portion 4a therein, engaged by the rollers 15a on one end of the lever 15, which is keyed to the shaft 16, all as shown best in Fig. 4 of the drawings. This shaft 16 may be connected to the steering rudder of a boat, or to steering wheels of a vehicle, as desired. It is to be noted that the pistons 3 and 4 engaging opposite ends of the lever 15 at the rollers 15a and 15b thereon, operate in opposite directions in the bore portions 2a and 2b. Connected to each opposite end of each of the pistons 3 and 4 is one of the cables 12, fixed thereto by set screws similar to the screws 4b in the piston 4, as shown in Fig. 4 of the drawings. The inner walls of the bore portions 2a and 2b are slotted to receive the arms of the lever 15, which extend therethrough, and the sealing rings 4c on the piston 4 at the limit of the piston travel, stop in spaced relation from the ends of these slotted portions 2c and 2d of the bore portions 2a and 2b, through which the arms of the lever 15 extend.

Figures 6, 7, 8, 9, 10, 11:
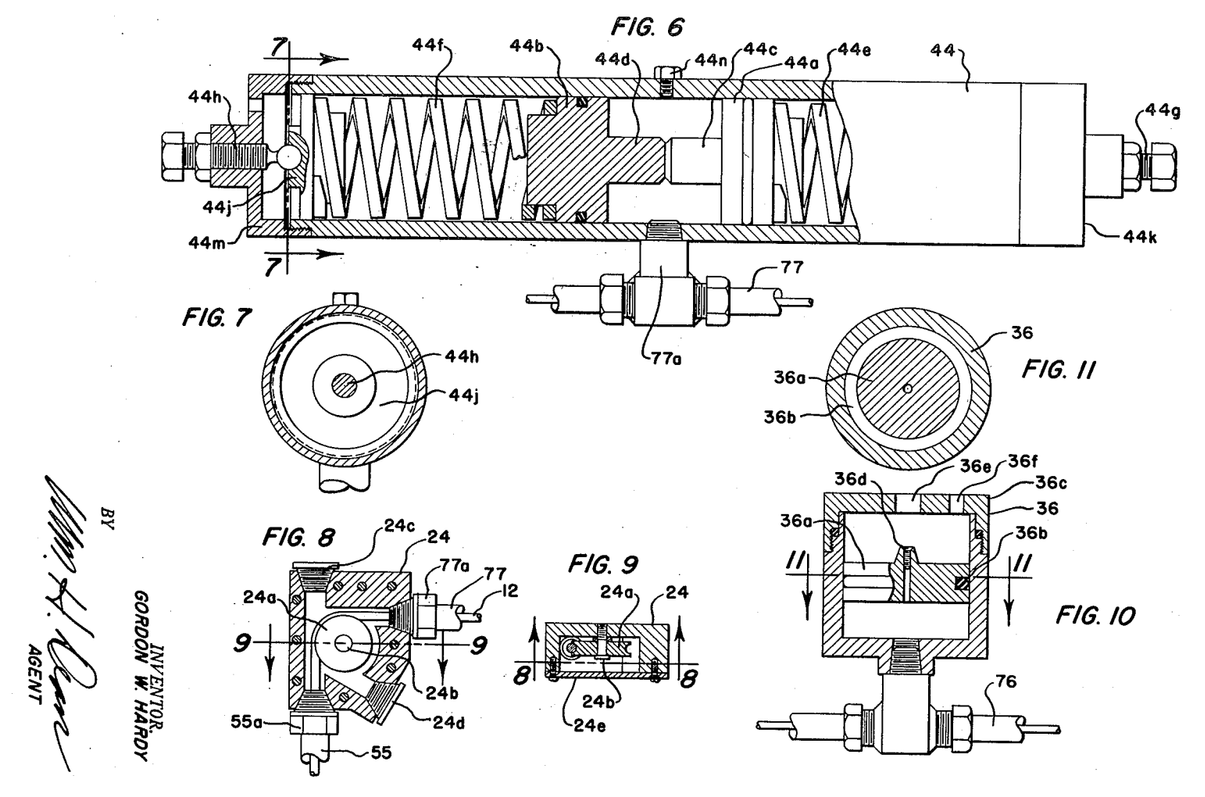
Fig. 6 is a fragmentary side elevational view of one of the surge chambers of my hydraulic steering apparatus, showing portions thereof broken away and in section to amplify the illustration.
Fig. 7 is a sectional view taken from the line 7—7 of Fig. 6.
Fig. 8 is an enlarged sectional view of one of the cable transition casings, showing parts and portions in elevation to facilitate the illustration.
Fig. 9 is a sectional view taken from the line 9—9 of Fig. 8.
Fig. 10 is a sectional view of one of the vacuum relief casings of my hydraulic steering apparatus, showing parts and portions in elevation to facilitate the illustration.
Fig. 11 is a sectional view taken from the line 11—11 of Fig. 10.
Figure 16:
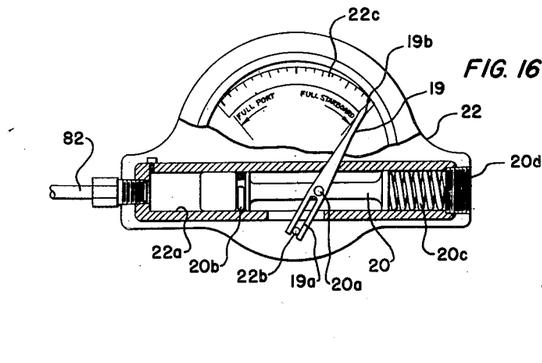
Fig. 16 is an enlarged side elevational view of the direction-indicating needle and casng, showing portons broken away and in section to amplify the illustration.

The piston connecting pin 23 is secured to the middle portion of the piston 4, and extends through the slotted portion 2e in the side of the bore 2b, opposite from the slot 2d, and connected to the opposite end of this pin 23 is the needle-actuating piston 21, reciprocally mounted in a reduced-bore portion 2f of the casing 2, parallel to the bore portion 2b, all as shown best in Fig. 4 of the drawings. The tube 82 communicates with the interior of the bore portion 2f at one end thereof, as shown best in Figs. 1, 4, and 16 of the drawings. The opposite end of this tube 82 communicates with the casing 22, in which the bore portion 22a thereof contains the needle-actuating piston 20, having a pin 20a projecting therefrom, on which the direction-indicating needle 19 is pivotally mounted. The stationary pin 22b, in connection with the casing 22, forms a fulcrum for the direction-indicating needle 19, which is provided with a slotted portion 19a, slidably engageable with said pin 22b, all as shown best in Fig. 16 of the drawings. The pointer end 19b of this direction-indicating needle 19 traverses a dial 22c, on the casing 22, which is calibrated to be used in connection with a boat steering apparatus, or the like. It will be noted that the piston 20 is provided with a sealing ring 20b, on one end, and a spring 20c engaging the opposite end, supported by the plug 20d, screw-threaded in the end of the bore 22a of the casing 22. As shown in Fig. 1 of the drawings, the bore portions 1a, 1b, 2a and 2b of the casings 1 and 2, respectively, communicate with each other through the cable and hydraulic conductors 54 to 77, inclusive, and the cables 12 extend through said cable and hydraulic conductors, and each angular transition of the cable and hydraulic conductors, one with the other, is accomplished by means of the cable transition casings 24 to 35, inclusive, all of which are similar in construction. The cable transition casing 24, as shown in Fig. 8 of the drawings, is a hydraulic conductor communicating with the tubes 77 and 55, through which one of the cables 12 passes. This cable transition casing is arranged to make a ninety degree angular transition of the cable, as shown in Figs. 1 and 8 of the drawings, wherein the cable 12 passes over a roller 24a rotatably mounted on a pin 24b. The cable and hydraulic conductors 55 and 77 are connected with the casing 24 by conventional fittings 55a and 77a, respectively, which are internally screw-threaded in the casing 24. A bleeder plug 24c is provided for purging the cable transition casing 24, and a secondary plug, 24d, is provided which may be replaced by one of the fittings 55a or 77a, in order to accomplish a forty-five degree transition of the cable 12 through the casing 24, if desired, it being noted that the axes of the fittings 55a, 77a and the plug 24d are all axially tangent to the roller 24a. It will be further noted that an obtuse angular transition through the casing 24 may be made by connecting cable and hydraulic conductors in the locations occupied by the plugs 24c and 24d, as desired. As shown in Fig. 9 of the drawings, one side of the casing 24 is enclosed by a sealing plate 24e, which is substantially fluid tight.

Figure 15:
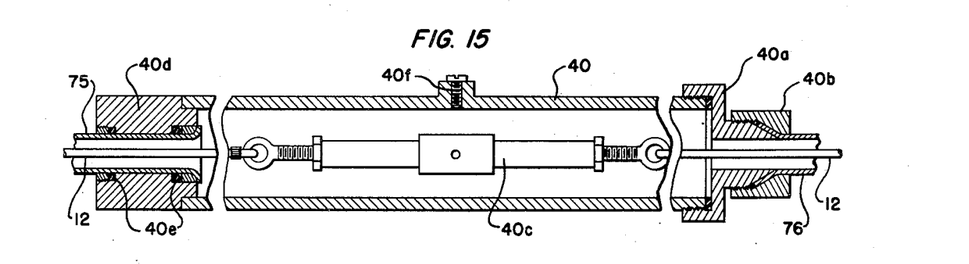
Fig. 15 is a fragmentary longitudinal sectional view of one of the cable connection casings of my hydraulic steering apparatus, showing the structure on enlarged scale, and showing parts therein in elevation to facilitate the illustration.

Communicating with each of the cable and hydraulic conductors 56, 65, 68 and 77 is a surge chamber adapted to maintain the hydraulic fluid therein under pressure. The surge chambers 44 to 47, inclusive, are substantially identical in construction. The surge chamber 44 as shown in Fig. 6 of the drawings, is a hollow cylindrical member, having pistons 44a and 44b therein, opposed to each other. These pistons 44a and 44b are provided with abutment projections 44c and 44d which maintain the pistons in slightly spaced relationship with each other, permitting communication therebetween with the cable and hydraulic conductor 77 through the fitting 77a. Tending to force these pistons 44a and 44b together are springs 44e and 44f, respectively, which are compressively adjusted by the adjusting screws 44g and 44h, respectively, bearing on compression plates 44j, all as shown best in Fig. 6 of the drawings. The caps 44k and 44m are screw-threaded on opposite ends of the casing 44, and the bleeder plug 44n communicates with the interior of the casing 44 intermediate the pistons 44a and 44b. Communicating with the cable and hydraulic conductors 57, 64, 69 and 76 are the vacuum relief casings designated 39, 37, 38 and 36, respectively. These vacuum relief casings 36 to 39, inclusive, are all similar in construction. The vacuum relief casing 36, as shown in Fig. 10 of the drawings, is a hollow cylindrical member having a freely reciprocally mounted piston 36a therein. This piston is provided with sealing ring 36b and the casing 36 is provided with a perforate cap 36c which permits vacuum relief communication with the upper side of the piston when fluid is evacuated from the normally lower side thereof, as shown in Fig. 10 of the drawings. Communicating with the interior of this vacuum relief casing 36 is the cable and hydraulic conductor 76, shown in Fig. 1 of the drawings. It will be noted that the piston 36a is provided with a screw-threaded bleeder plug 36d, which normally extends through the opening 36e in the cap 36c, which incorporates a secondary vent opening 36f operative when the bleeder 36d is projecting through the opening 36e. The cable connection casings 40 to 43, inclusive, as shown in Fig. 1 of the drawings, are substantially identical in construction. The cable connection casing 40, shown in detail in Fig. 15 of the drawings, is a hollow cylindrical member and provided with an externally screw-threaded cap 40a on one end thereof, to which the cable and hydraulic conductor 76 is fixed in fluid-tight relationship therewith by a fitting 40b. The cables 12 extending through the cable connection casing 40 are secured to the right-and-left-hand turnbuckle 40c, which is arranged to connect the cables and adjust the tension thereof during initial assembly. The opposite end of the casing 40 from the cap 40a is provided with a hollow cylindrical fitting 40d, slidably mounted on the outer side of the tubular cable and hydraulic conductor 75 and internally of this hollow cylindrical member 40d are sealing rings 40e, which seal the hydraulic fluid within the conductor 75 and the casing 40 when passing back and forth therein. Centrally disposed in this cable connection casing 40 is a bleeder plug 40f for use in purging the casing 40.

The cable take-up casings 50 to 53, inclusive, are similar in construction, and are arranged to maintain tension in all of the cables 12 within the cable and hydraulic conductors 54 to 77, inclusive. The cable take-up casing 50 is a hollow cylindrical member having a cover plate 50a on one side thereof which is sealed in fluid-tight relationship therewith. Internally of the casing 50 are roller-supporting pistons 50b and 50c, between which is interposed the spring 50d, which tends to force the pistons 50b and 50c apart. The cable 12, extending through the cable and hydraulic conductors 76 and 77, is looped around the rollers 50e and 50f, which permit the cable 12 to be extended or retracted into the casing 50, dictated by the preload of the spring 50d, which is so designed to accommodate normal working loads, but which flexes in the event overloads are imposed upon the cable 12.

Figure 12:
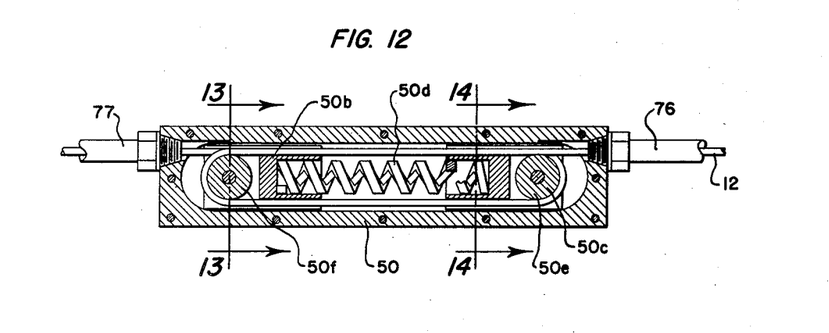
Fig. 12 is a longitudinal sectional view of one of the cable connection casings shown on enlarged scale and illustrating some of the parts and portions therein in elevation.
Figure 13:
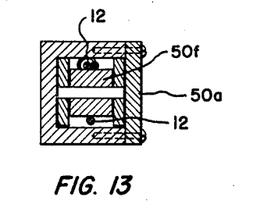
Fig. 13 is a sectional view taken from the line 13—13 of Fig. 12.
Figure 14:
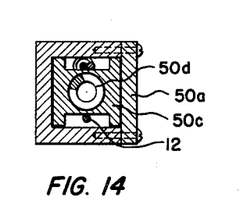
Fig. 14 is a sectional view taken from the line 14—14 of Fig. 12.

The operation of my hydraulic steering apparatus is substantially as follows: When the operator turns the steering wheel 48, rotating the shaft 49, the screw 8, as shown in Fig. 2 of the drawings, causes longitudinal movement of the crosshead 7 relative to the axes of the bore portions 1a and 1b of the casing 1, carrying the pistons 5 and 6, respectively, longitudinally of said bore portions 1a and 1b, which expels hydraulic fluid outwardly thereof into the cable and hydraulic conductors 54 and 67, or 55 and 66, in accordance with the directional rotation of the steering wheel 48. Simultaneously the cables 12 are retracted into the bore portions 1a and 1b of the casing 1, and extended from the opposite ends of the bore portions 1a and 1b in accordance with the directional rotation of the steering wheel 48. The cables 12 extending through the cable and hydraulic conductors 54 to 77, inclusive, pass over the rollers in the transition casings 24 to 35, inclusive, as hereinbefore described, and the cables each pass through one of the cable take-up casings, as described in connection with Fig. 12 of the drawings, which maintain all of the cables in proper preloaded tensional condition, so that normal working loads of the system are accommodated without deflection of the springs in the cable take-up casings, which are all similar to the spring designated 50d in Fig. 12 of the drawings. With each reciprocal movement of the pistons 5 and 6, corresponding movement of the pistons 3 and 4 occurs, due to hydraulic transmission of fluid thereto, which causes rotative action of the shaft 16, forced by the lever 15 engaging the pistons 3 and 4 at their middle portions, as shown best in Fig. 4 of the drawings. Each reciprocal movement of the piston 4 causes simultaneous and synchronized movement of the piston 21, which conducts fluid through the tube 82 to the direction indicator casing 22, in which the piston 20 is reciprocally mounted, actuating the direction-indicating needle 19, cooperating with the dial 22c which indicates the directional disposition of the boat rudder, or other steering apparatus in connection, so that the operator may, at all times, determine the direction and degree of deflection of the rudder of a boat, or steering mechanism of any other vehicle to which my hydraulic steering apparatus may be connected. The surge chambers 44 to 47, inclusive, having opposed spring-loaded pistons therein, as shown in Fig. 6 of the drawings, provide for the cushioning of shock loads which may be applied to the rudder, causing displacement of fluid in the bore portions 2a and 2b of the casing 2, which is transmitted through the cable and hydraulic conductors 54 to 77, inclusive, and abutted by the pistons 5 and 6, which are longitudinally immovable in connection with the screw 8. Thus, forceful deflection of a boat rudder, causing displacement of fluid in the bore portions 2a and 2b of the casing 2 by the pistons 3 and 4, simply compresses the springs 44e and 44f, as shown in Fig. 6 of the drawings, permitting the fluid displaced from the bore portions 2a and 2b to pass into the surge chamber 44, or any other of the surge chambers 44 to 47, inclusive, as shown in Fig. 1 of the drawings, as the case may be. When the rudder of a boat is deflected in one direction, it may cause exhaustion of fluid from some of the cable and hydraulic conductors 54 to 77, inclusive, in which case the vacuum relief casings supply fluid to balance the exhaustion of fluid from that portion of the system. These vacuum relief casings, as shown in Fig. 10 of the drawings, are provided with freely movable pistons which follow the exhaustion of fluid from the vacuum relief cylinders 36 to 39, inclusive. For example, the vacuum relief cylinder 36, having the piston 36a therein, may be exhausted of fluid wherein the piston 36a travels toward the cable and hydraulic tube 76, permitting air to enter the opposite side of the casing through the openings 36e and 36f. Thus, compression of the springs 44f and 44e, as shown in Fig. 6 of the drawings, may occur concurrently with exhaustion of fluid from one of the vacuum relief casings 36 to 39, inclusive, as shown in Fig. 10 of the drawings. It is therefore obvious that forceful deflection of a rudder does not cause any serious strain or permanent effects on any portion of my hydraulic steering apparatus, due to the preloaded arrangement of the fluid by the springs 44e and 44f, and by the preloaded arrangement of the cables 12 in the cable take-up casings 50 to 53, inclusive, as shown in Fig. 12 of the drawings. Concurrent to displacement of fluid in the system due to deflection of the rudder, extension and retraction of the cables 12 must be accomplished, which compensation is made by the cable take-up casings 50 to 53, inclusive, as shown in Fig. 12, wherein the spring 50d of the cable take-up casing 50 serves to preload the cables 12 and serves as a resilient, compressible medium which may be deflected when extension of the cables 12 is dictated by deflection of the rudder in connection with my hydraulic steering apparatus, or the deflection of any other steering medium, controlled by my hydraulic steering apparatus.

In the installation as shown in Fig. 1 of the drawings, the plug 24c of the cable transition casing 24, illustrated in detail in Fig. 8 of the drawings, is replaced by a fitting supporting one end of the hydraulic conductor 78, which extends to the check valve 83a of the pump 83b in the supply reservoir 83c. The hydraulic tube 80 communicates with the check valve 83a and supplies fluid to the cable transition casing 26. The check valve 83d communicates with the hydraulic tubes 79 and 81 and supplies fluid to the hydraulic system through the cable transition casings 25 and 27, respectively. In connection with this check valve 83d is a pump 83e, and access to these pumps 83b and 83e may be had by opening the cover 83f of the casing 83c. In use the cover is uppermost, permitting the fluid to gravitate downwardly around the pumps 83b and 83e, which are manual pumps similar to those designated 42 and 44 in Fig. 5 of my former patent application, Ser. No. 571,571, filed January 6, 1945. This supply reservoir 83c, having the pumps 83b and 83e therein, permits the operator to readily purge any portion of the hydraulic system desired by opening a bleeder and actuating one of the pumps which forces any bubbles present out of the system, as desired.

Figure 17:
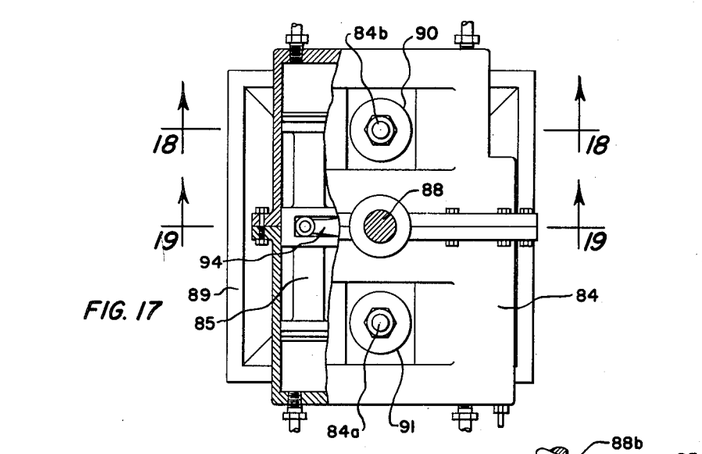
Fig. 17 is a plan sectional view of a modified form of my steering apparatus, showing the actuated cylinder casing thereof.
Figures 18, 19:
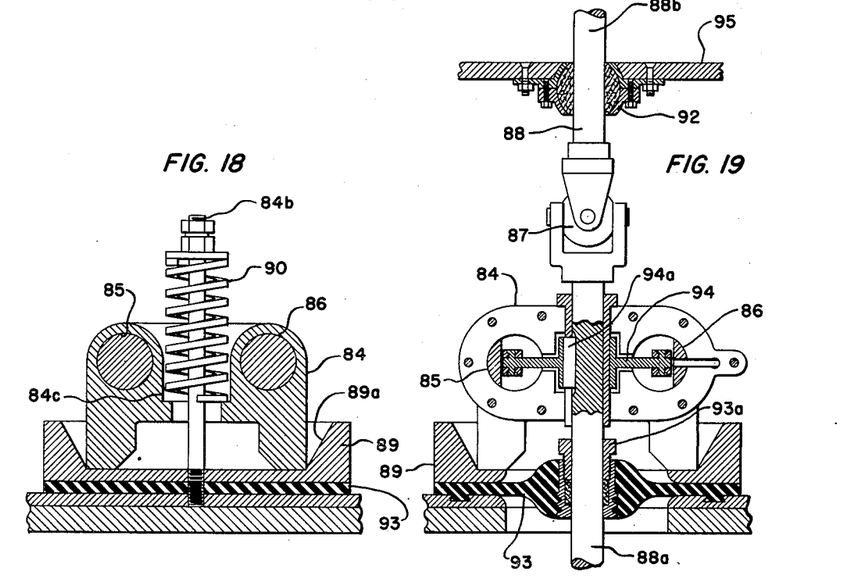
Fig. 18 is a sectional view taken from the line 18—18 of Fig. 17, showing parts in elevation to facilitate the illustration.
Fig. 19 is a fragmentary sectional view taken from the line 19—19 of Fig. 17.

In the modification, as shown in Figs. 17, 18 and 19 of the drawings, the parts are designated as follows: The casing 84, pistons 85 and 86, universal joint 87, control shaft 88, base 89, springs 90 and 91, bearing 92, and the diaphragm 93.

The casing 84 is similar to the casing 2 hereinbefore described in Fig. 4 of the drawings. The pistons 85 and 86 are similar to the pistons 3 and 4 in the casing 2. A lever 94, interconnects the pistons 85 and 86 and is fixed on the shaft 88 in a similar manner to the lever 15, shown in Fig. 4 of the drawings. The general operation of the casing 84 is similar to that of the casing 2, disclosed in Fig. 4 of the drawings. Extending through this casing 84, transversely to the axis of the bore portions therein, in which the pistons 85 and 86 are reciprocally mounted, are the bolts 84a and 84b, which retain the springs 91 and 90, respectively. These springs are compression springs, tending to hold the casing 84 downwardly in connection with the base 89, as shown best in Fig. 18 of the drawings. Each of the springs 90 and 91 is fitted in a well, shown in Fig. 18 of the drawings, designated 84c. The base 89 is provided with upwardly and outwardly inclined wall portions 89a, and is mounted on a resilient diaphragm 93, through which the lower portion 88a of the shaft 88 extends. Centrally located in this diaphragm 93 is a packing gland 93a, through which the shaft 88a extends. The shaft 88a is fixed to the lever 94 by means of the key 94a, and the universal joint 87 interconnects the lower shaft portion 88a with the upper shaft portion 88b. This upper shaft portion 88b extends through a stationary spheroid bearing 92, permitting angular deflection of the shaft portion 88b, all as shown best in Fig. 19 of the drawings. The particular modified structure, as shown in Figs. 17 to 19, inclusive, of the drawings, is adapted for use in connection with boat rudders having a vertical control shaft 88. The upper end of this control shaft 88 is arranged for manual operation, while the lower end of the shaft 88, at its portion 88a, is connected to the rudder externally of the boat hull. During normal operation, the hydraulic fluid passing into and out of the casing 84, in engagement with the pistons 85 and 86, causes actuation of the rudder, as hereinbefore described in connection with Figs. 1 and 4 of the drawings. In operating the modified structure, it is possible to use the boat when hydraulic operation is impaired. Thus, manual operation of the shaft 88b when the hydraulic system fails, provides an auxiliary control for the boat rudder, or any other steering mechanism involved. When the modified structure shown in Figs. 17 to 19, inclusive, is used in connection with a boat, and rudder is connected to the shaft portion 88a, and when this rudder contacts an obstruction and is deflected, the shaft 88a, together with the casing 84, is moved upwardly and laterally along the inclined planes 89a of the base 89, while the diaphragm 93 flexes, due to its resilient character. The universal joint 87 transmits motion in angular relationship intermediate the shaft portions 88a and 88b, while the spheroid bearing 92 permits varied angular disposition of the shaft 88b relative to the plane of the deck 95.

Though I have shown and described a particular construction, combination and arrangement of parts and portions, and a certain modification, I do not wish to be limited to this particular construction combination and arrangement, but desire to include in the scope of my invention the construction, combination and arrangement substantially as set forth in the appended claims.

Having thus described my invention, what I claim as new and desire to be secured by Letters Patent is:

1. In a hydraulic steering mechanism of the class described, the combination of a master cylinder and an actuated cylinder, each of said cylinders having reciprocal pistons therein, tubular conductors interconnecting and intercommunicating with each of said cylinders and said pistons, and cables extending through said conductors interconnecting said pistons, cable take-up casings communicating with said tubular conductors, each having a pair of opposed rollers in connection therewith, a spring interposed between said rollers and tending to separate the rollers, said cables looped around said rollers, whereby tension in connection with said rollers tends to retract said cables into said cable take-up casing from each end thereof.

2. In a hydraulic steering mechanism of the class described, the combination of a master cylinder and an actuated cylinder, each of said cylinders having reciprocal pistons therein, tubular conductors interconnecting and intercommunicating with each of said cylinders and said pistons, and cables extending through said conductors interconnecting said pistons, a cable connection casing communicating with each of said tubular conductors and having a turnbuckle therein connecting said cable for adjustment thereon, one end of said cable connection casing screw-threadably connected with said conductor, the other end thereof longitudinally slidable over said conductor for exposing said turnbuckle.

3. In a hydraulic steering mechanism of the class described, the combination of a master cylinder and an actuated cylinder, each of said cylinders having reciprocal pistons therein, tubular conductors interconnecting and intercommunicating with each of said cylinders and said pistons, cables extending through said conductors interconnecting said pistons, and a surge chamber communicating with each of said tubular conductors, having abutted pistons therein, resiliently loaded toward each other, said tubular conductor communicating intermediate said pistons, whereby a pressure overload of fluid in said said conductors causes resilient separation of said pistons in said surge chamber.

4. In a hydraulic steering mechanism of the class described, the combination of a master cylinder and an actuated cylinder, each of said cylinders having reciprocal pistons therein, tubular conductors interconnecting and intercommunicating with each of said cylinders and said pistons, and cables extending through said conductors interconnecting said pistons, cable transition casings communicating with each of said tubular conductors, having rollers therein for guiding said cables in angular relationship corresponding to angular disposition of some of said conductors relatively to each other, a surge chamber communicating with each of said tubular conductors having opposed pistons therein, spring means urging the last mentioned pistons toward each other, a cable connection casing communicating with each of said tubular conductors at its opposite ends, having a turnbuckle therein interconnecting said cable, one end of said cable connection casing screw-threadably sealed to one of said tubular conductors, the opposite end of said cable connection casing slideably sealed on one of the other tubular conductors, permitting reciprocal movement of said casing for exposing said turnbuckle, a cable take-up casing in connection with each of said tubular conductors, having rollers, spring means urging said rollers away from each other, around which rollers said cable is wound, and a vacuum relief casing communicating with each of said tubular conductors, having a freely movable piston therein, said casing vented at the opposite side of said piston from its communication with its respective tubular conductor.

5. In remote control apparatus, a casing having a pair of parallel bore portions therein, pistons in said bore portions reciprocally mounted therein, a crosshead interconnecting said pistons, extending through slots in the side walls of said bore portions, said crosshead having an internally screw-threaded central portion, a screw threadably engaged with said internally screw-threaded portion intermediate said bore portions, and a steering shaft in connection with said screw, a second casing having a pair of parallel bore portions therein, pistons in said bore portions of said second-mentioned casing, a lever pivotally mounted intermediate the last mentioned bore portions, a shaft fixed to the last mentioned lever, said bore portions having slots in the side walls thereof through which opposite ends of said lever extend, and tubular conductors interconnecting the bore portions of said first and second casings.

6. In remote control apparatus, a casing having a pair of parallel bore portions therein, pistons in said bore portions reciprocally mounted therein, a crosshead interconnecting said pistons, extending through slots in the side walls of said bore portions, said crosshead having an internally screw-threaded central portion, a screw threadably engaged with said internally screw-threaded portion intermediate said bore portions, and a steering shaft in connection with said screw, a second casing having a pair of parallel bore portions therein, pistons in said bore portions of said second-mentioned casing, a lever pivotally mounted intermediate said bore portions, a shaft fixed to said lever, said bore portions having slots in the side walls thereof through which opposite ends of said lever extend, and tubular conductors interconnecting the bore portions of said first and second casings, said shaft extending through said lever in said second-mentioned casing having a universal joint therein, the normally upper end of said shaft being a manually operated shaft, a spheroid bearing engaging the same, said spheroid bearing supported by the deck of a boat, said second-mentioned casing having a base therefor, provided with outwardly and upwardly inclined walls, resilient means operatively connected to the second mentioned casing and said base to hold said casing downwardly in said base, a resilient diaphragm on which said base is mounted, said diaphragm having a central bearing and packing gland therein, through which the lower portion of said steering shaft extends, whereby deflection of the lower portion of said steering shaft causes deflection of said diaphragm, permitting said casing to move outwardly and upwardly on said inclined walls of said base, and causing flexure of said universal joint, permitting the upper and lower portions of said steering control shaft to be angularly disposed to each other.

7. In a hydraulic steering mechanism of the class described, the combination of a master cylinder casing having two bores therein in side by side relation, a motor cylinder casing having two bores therein in side by side relation, tubular conductors interconnecting the bores of the master cylinder casing with the bores of the motor cylinder casing, a piston operatively mounted in each of said bores, cables extending through said conductors and interconnecting the corresponding pistons, a vacuum relief casing in communication with each of said conductors and having a freely movable piston therein, an air vent in the end of said vacuum relief casing remote from the corresponding conductor, said piston having a channel therethrough and a bleeder plug closing said channel.

References Cited in the file of this patent
UNITED STATES PATENTS

| Number | Name | Date |
|---|---|---|
| 375,674 | Greene | Dec. 27, 1887 |
| 560,934 | Robertson | May 26, 1896 |
| 622,600 | Brown | Apr. 4, 1899 |
| 1,621,916 | Williams | Mar. 22, 1927 |
| 1,687,720 | Garner | Oct. 16, 1928 |
| 1,723,789 | Kirkbride | Aug. 6, 1929 |
| 2,109,114 | Kerr | Feb. 22, 1938 |
| 2,168,215 | Keitel | Aug. 1, 1939 |
| 2,242,542 | Peterson et al. | May 20, 1941 |
| 2,344,473 | Stevenson | Mar. 14, 1944 |
| 2,348,323 | Binder | May 9, 1944 |
| 2,420,627 | Stevenson | May 13, 1947 |
| 2,524,449 | Kellogg | Oct. 3, 1950 |
| 2,558,684 | Haase | June 26, 1951 |
| 2,595,775 | Wrangell | May 6, 1952 |